United States Patent [19]
Bowers

[11] Patent Number: 5,278,489
[45] Date of Patent: Jan. 11, 1994

[54] MULTI-PHASE SWITCHING POWER SUPPLY

[75] Inventor: Mark C. Bowers, Vandalia, Ohio

[73] Assignee: Scitex Digital Printing, Inc., Dayton, Ohio

[21] Appl. No.: 891,340

[22] Filed: May 29, 1992

[51] Int. Cl.⁵ .............................................. H02M 7/00
[52] U.S. Cl. ..................................... 323/225; 323/222; 363/45; 363/124
[58] Field of Search ............... 323/222, 225, 268, 269, 323/350; 363/45, 46, 124

[56] References Cited
U.S. PATENT DOCUMENTS 4,384,321  5/1983  Rippel .................................. 363/124
4,513,361  4/1985  Rensink ............................. 323/222 X Primary Examiner—Emanuel T. Voeltz
Attorney, Agent, or Firm—Barbara Joan Haushalter

[57] ABSTRACT

A switching power supply converts DC to DC voltages. The switching power supply has multiple phase time delayed voltage generating circuits and a single switching power supply regulator circuit. The multiple phase time delayed voltage generating circuits are then synchronized with a pulse period of the switching power supply regulator circuit to achieve the conversion.

5 Claims, 2 Drawing Sheets

MULTI-PHASE SWITCHING POWER SUPPLY

TECHNICAL FIELD

The present invention relates to DC to DC switching power supplies and, more particularly, to increasing the power output, reducing component electrical stresses, and increasing conversion efficiency for DC to DC switching power supplies.

BACKGROUND ART

Switching power supply or converter topology using a boost circuit is known in the art and is a basic technology for many applications. However, certain limitations are encountered when practical designs are implemented. For example, although it is common to use boost circuits to generate voltages, the resulting limited power output capacity prevents the most efficient use of the boost circuits. Typically, then, concerns relating to power density, component stresses, and efficiency are compromised.

An inductor boost circuit is usually operated in one of two regions or modes of operation. These regions are commonly known as discontinuous and continuous modes. These terms relate to the type of current present in the inductor during operation. With the continuous mode, there is continuous current (DC) in the inductor; whereas with the discontinuous mode, there are times when there is no current passing through the inductor. The continuous mode necessitates a larger inductor and more inductor core losses than would be necessary if the discontinuous mode were used. However, the discontinuous mode causes higher peak ripple currents through components at a given power output. The power output of a single boost circuit is typically limited to 100 watts in practical designs.

There are advantages and disadvantages to both the continuous and discontinuous modes. For example, an advantage to using the continuous mode is that it can produce a greater output power. However, the continuous mode is disadvantageous in that it is less efficient than the discontinuous mode, and is subject to subharmonic oscillations, depending on the current duty cycle and the inductor size. While the discontinuous mode is more efficient, it causes higher peak current and has a lower output power, as compared to the continuous mode. If the power output of a discontinuous mode is increased, the peak or ripple currents become increasingly stressful to the circuit components.

In the prior art, a multi-stage technique is used to control or enhance the power factor of the AC input power, as described in U.S. Pat. Nos. 4,982,148 and 4,600,982. Unfortunately, the techniques described in the prior art do not sufficiently address the enhancement of efficiency and the reduction of relative peak or ripple currents in components.

It is seen then that there exists a need for a means of reducing ripple current which overcomes the problems of power output loss and decreased efficiency encountered in the prior art.

SUMMARY OF THE INVENTION

This need is met by the system according to the present invention, wherein reduced ripple current is achieved by paralleling time delayed switching power supply circuits, and particularly boost circuits. The technique of the present invention is used to maximize the efficiency of a switching power converter while reducing the peak or ripple currents for a given power output. It is an advantage of the present invention that, rather than increasing the power output by increasing the size of the inductor in a circuit, the number of inductor circuits is increased.

In accordance with one aspect of the present invention, a switching power supply for converting DC to DC voltages comprises multiple phase time delayed voltage generating circuits controlled by a single switching power supply regulator circuit. Synchronization means then time synchronization of the multiple phase time delayed voltage generating circuits with a pulse period of the switching power supply regulator circuit to convert the DC to DC voltages.

Accordingly, it is an object of the present invention to provide reduced ripple current by paralleling time shifted switching power supply circuits. It is an advantage of the present invention that only the minimum number of power generating circuits are activated during low output power load conditions. It is a feature of the present invention that the number of multi-phase circuits active can be altered so as to allow the power output capacity to be set at the time of manufacturing. One power supply design can be assembled with phases missing or present to set the power output capacity of the power supply.

Other objects and advantages of the invention will be apparent from the following description, the accompanying drawings and the appended claims.

DETAILED DESCRIPTION OF THE PREFERRED EMBODIMENTS

The present invention reduces ripple current in the components of an ink jet printer by paralleling time shifted switching power supply circuits. Many switching power supplies are based upon energy storage of an inductor. In a boost circuit, energy is pumped into the inductor at a predetermined voltage and current, and is then extracted at another voltage and current. Compared to the input, the extracted voltage is always higher, while the extracted current is always lower.

There are three possible ways to increase the energy storage and output. One is to increase the inductance, which increases the size of the inductor. A second is to increase the current, which also increases the inductor size. The third way is to use more inductors. Although this increases the number of components, the inductors are smaller in size than the inductor used in the single circuit method. The third technique, then, is simply the merging of two separate power supplies into one circuit with several shared components. When the charging and discharging of multiple inductors are time shifted, in the multi-phase method, the input and output peak currents of the inductors do not overlap or significantly reinforce each other. In accord with the present invention, this process can be extended to combine several stages or phases of inductors.

Figure 1:
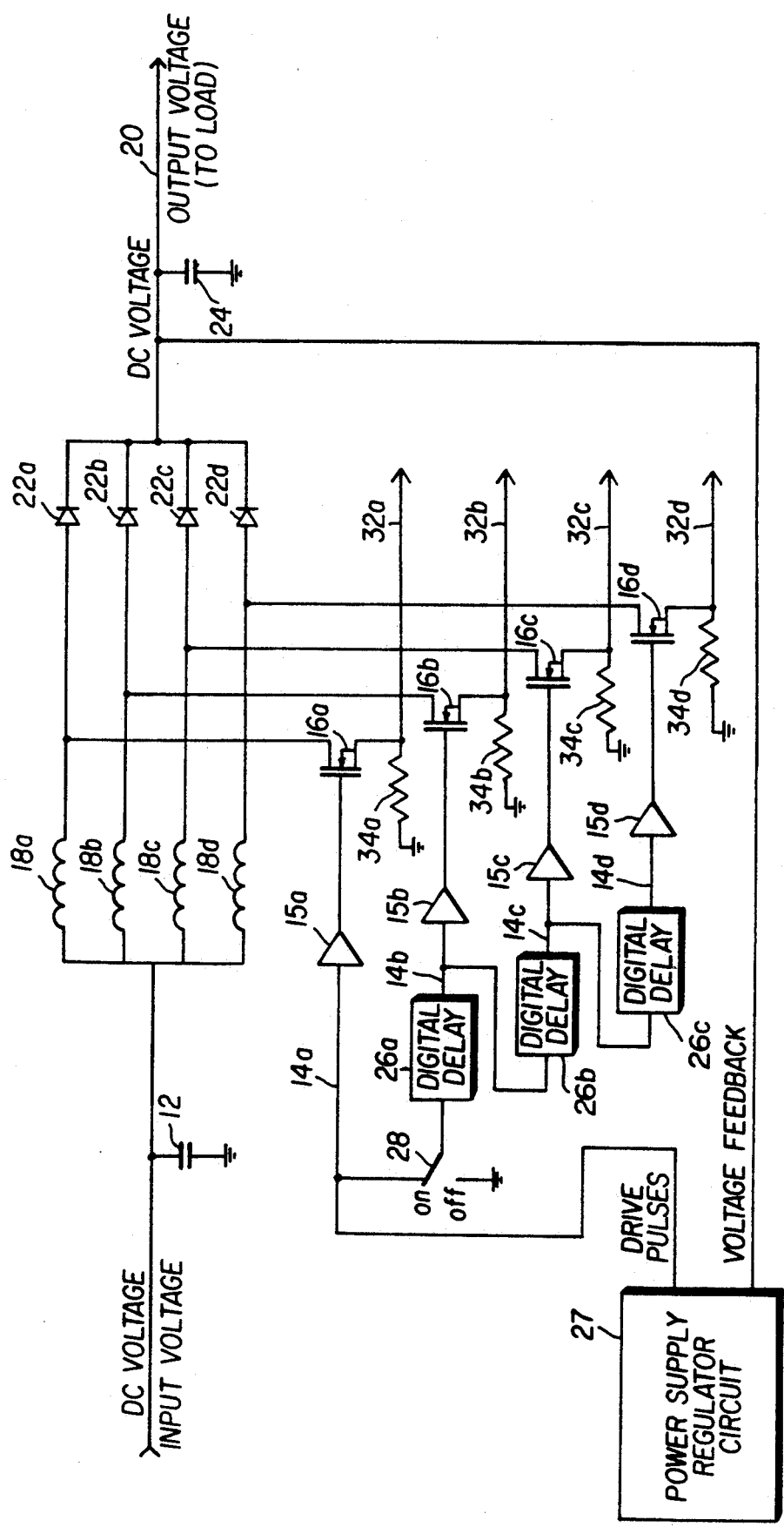
FIG. 1 is a schematic of a multi-phase boost circuit in accord with the present invention.

Referring now to the drawings, FIG. 1 illustrates a schematic of a multi-phase boost circuit 10 in accordance with the present invention. In FIG. 1, a single phase, as in a typical boost circuit, a DC current and voltage input 12 provides power for the circuit 10. A switch signal 14a provides a means for energizing a first transistor 16a and to draw current through a first inductor 18a. As the current is drawn through the first inductor 18a, energy is stored. When the switch signal 14a ends, this energy is transferred to an output 20 through a first diode 22a to an output energy storage capacitor 24. The output 20 voltage is monitored by a power regulator circuit 27 which adjusts the pulse width of the switch signal 14a to regulate the output 20 voltage.

In a multi-phase configuration of a boost circuit 10, as shown in FIG. 1, the switch signal 14a is multiple time delayed to provide switch signals 14a, 14b, 14c, and 14d through drivers 15a, 15b, 15c, and 15d, respectively. The switch signals provide altered switch on times for each transistor 16a, 16b, 16c, and 16d, respectively. The output ripple currents from diodes 22a, 22b, 22c, and 22d into the energy output storage capacitor 24, are not superimposed at the output voltage 20. This provides a measure of reduced output ripple current while increasing the output power. These currents appear very much like the current in a single inductor circuit in which the switching frequency has been quadrupled. Hence, the multiple switching circuits effectively reduce the ripple current appearing in the shared input capacitor.

For a given power output as compared to a scaled up single switching circuit, the multiple switching circuit provides a proportional reduction in the ripple current. As the output load increases beyond a threshold, the input AC ripple current decreases because the multiple input currents sum and increasingly form a constant current. The use of multiple switching circuits, then, reduces electromagnetic interference (EMI) problems, since high frequency AC currents directly contribute to EMI. As power levels increase, a reduction in the magnitude of AC currents helps to control the level of EMI.

The present invention, as embodied in FIG. 1, maximizes the efficiency of a switching power converter in such a manner as to reduce the peak or ripple currents for a given power output. Rather than increasing the size of the inductor to increase the power output, the number of inductor circuits is increased. These boost subcircuits are timed or phased so as to have each of the individual peak output currents to be non overlapping. Preferably, each subcircuit is timed to have its output occur in unison, and time shifted with respect to the other boost subcircuits. Preferably, timing is synchronized to create a symmetrical periodic pulse train of output power. If, for example, four boost subcircuits are used with each having an output time period P, then each subcircuit would be delayed by digital shift registers, such as digital delays 26a, 26b, and 26c shown in FIG. 1, from each other by P/4 time period. The digital delays 26a, 26b, and 26c may be created, for example, by using CMOS static shift registers clocked by an oscillator of specific time period. One possible embodiment, to be described for purposes of illustration only and not to be considered as limiting the invention, is a design that utilizes three commercially available CMOS dual 64 bit static shift registers in series clocked by an oscillator running at 6 MHz, with outputs from taps every 96 bits. The input pulse 14a to the first shift register 26a is generated by a commercially available switched mode power supply control circuit 27 with a nominal output pulse period designed to be on the order of 15.6 KHz. Synchronization means then synchronize the multiple phase time delayed voltage generating circuits 26a, 26b, and 26c, with a pulse period of the switching power supply regulator circuit 27 to convert the DC to DC voltages.

The net result of a multi-phase converter is a proportional, as to the number of circuits, increase of the output power, yet the peak or ripple currents are of the same magnitude as an individual circuit. With the proper timing and various output loads, the input power current ripple can be less because of the input current of the inductor adding together to cause a continuous current.

Figure 2:
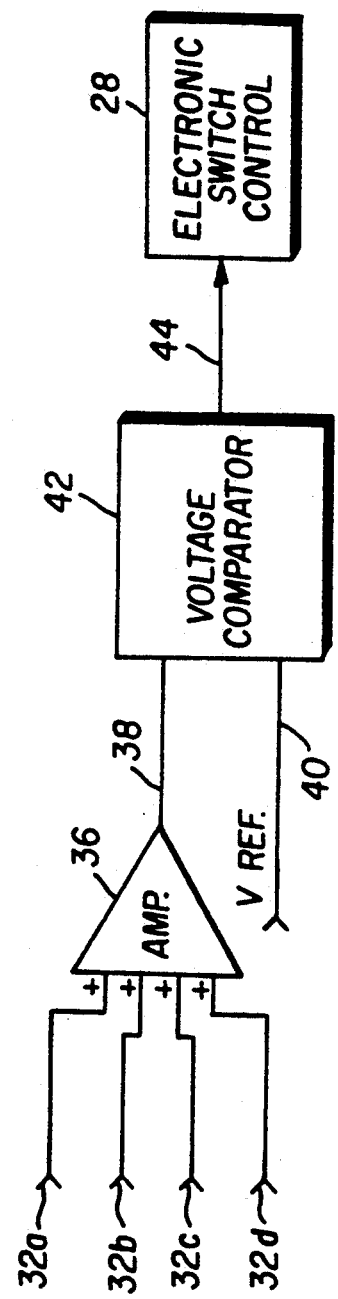
FIG. 2 is a schematic of a power idle circuit associated with the boost circuit of FIG. 1.

Referring now to FIG. 2 and continuing with FIG. 1, the multi-phase boost circuit 10 of FIG. 1 allows for an additional, but not required, feature. A control switch 28 permits the circuit 10 to revert to a single inductor boost circuit, where the later phases are disenabled. This control switch 28 is controlled by a power idle circuit 30 of FIG. 2. Voltages along lines 32a, 32b, 32c, and 32d developed across source resistors 34a, 34b, 34c, and 34d, respectively, of transistors 16a, 16b, 16c, and 16d, respectively, are each proportional to the current through each corresponding transistor. A voltage summing amplifier 36 adds the voltages along lines 32a, 32b, 32c, and 32d and outputs a summed amplified signal along line 38. A reference voltage along line 40 sets a trigger point of a voltage comparator 42. Whenever the amplified signal along line 38 exceeds the reference voltage on line 40, a logic level signal on line 44 is toggled. This logic signal on line 44 controls the pole position of the control switch 28. The control switch 28 selects signal 14a or a ground (zero) signal for the following transistor stages. It should be noted that similar methods can be used to activate the different phases at different load levels having more than one threshold. The above embodiment activates either one or four phases. This technique can be extended to multiple threshold trigger points, where any number of phases can be activated by the output load characteristics.

The feature of the control switch 28 alters the forward loop gain of the regulator circuit and can be useful in stabilizing the power or voltage regulator circuit response as the load of the power supply is varied from near zero to full load. Alternatively, the feature of the control switch 28 may be used as a method for reducing the number of components which are switching and, thereby, reduce the electrical noise generated by the switching components.

With the embodiment of multi-phasing comes the ability to use a more efficient but higher peak current and lower output power supply circuit topology. This permits the use of the discontinuous, rather than the continuous, in boost topology circuitry. The deficiencies of a single discontinuous boost circuit are overcome by the multi-phasing of several individual boost circuits.

Multiphasing enhances other aspects of power supply design as well. Transformer or inductor core losses increase with increased frequencies and increased core flux densities. If an inductor core could be operated at a lower frequency and still store sufficient energy in the flux fields, efficiency is increased. A discontinuous boost circuit permits the use of a smaller inductor, having lower inductance, and therefore some size tradeoffs can be exchanged for benefits of improved efficiency of lower frequency operation. Consequently, total DC to DC conversion efficiencies (greater than 200 watts with a 4 to 1 voltage boost) of 90% or greater can be achieved in practical designs.

An advantage of a multiphase power supply of the present invention is that the number of active phases can be adjusted according to the output load conditions. If the output power requirements are low, then only the number of phases necessary to supply the required power output need to be activated. If this adaptive output power feature is not required, the number of phases used can be fixed at manufacturing time by omitting parts. This affords a wide range of power output from a single power supply unit. With the present invention, part changes are minimal if any, and power output capacity can be changed by leaving out parts from the circuit.

INDUSTRIAL APPLICABILITY AND ADVANTAGES

The present invention is useful in the field of switching power supplies, and has the advantage of increasing power output while reducing electrical stress in the components used in switching supplies. The present invention has the further advantage of increasing power output from a single power supply and increasing conversion efficiency. The present invention includes an adaptive power output feature, where only the minimum number of power generating circuits are activated during low output power load conditions. Additionally, the use of multiphase switching circuits increase the dynamic range of the output power and increase the magnitude of the output power for a given set of circuit components. The physical form factor of a power supply for a given power output can be improved with multiple small inductors or transformers. It can be physically advantageous to mount multiple small inductors or transformers on a printed circuit board rather than a single large inductor or transformer.

The invention has been described in detail with particular reference to certain preferred embodiments thereof, but it will be understood that modifications and variations can be effected within the spirit and scope of the invention.

I claim:

1. A switching power supply for converting DC to DC voltages comprising:
    a. a plurality of multiple phase time delayed voltage generating circuits;
    b. a switching power supply regulator circuit;
    c. synchronization means for synchronizing the plurality of multiple phase time delayed voltage generating circuits with a pulse period of the switching power supply regulator circuit; and
    d. means for altering the number of the plurality of multiple phase time delayed voltage generating circuits.

2. A switching power supply as claimed in claim 1 wherein each of the plurality of multiple phase time delayed voltage generating circuits shares an input source filter and an output filter.

3. A switching power supply as claimed in claim 1 wherein the synchronization means is uniformly distributed over a period of the switching power supply regulator circuit.

4. A switching power supply as claimed in claim 1 wherein a start time of each of the plurality of multiple phase time delayed voltage generating circuits has a time delay equivalent to a previous of the plurality of multiple phase time delayed voltage generating circuits.

5. A switching power supply as claimed in claim 1 wherein the plurality of multiple phase time delayed voltage generating circuits comprises a plurality of shift registers.

* * * * *